United States Patent [19]

Okabe et al.

[11] Patent Number: 5,330,678

[45] Date of Patent: Jul. 19, 1994

[54] LIQUID CRYSTAL COMPOUND

[75] Inventors: Nobuhiro Okabe; Hiroyuki Mogamiya; Noriko Yamakawa, all of Chiyoda, Japan

[73] Assignee: Showa Shell Sekiyu Kabushiki Kaisha, Tokyo, Japan

[21] Appl. No.: 66,445

[22] Filed: May 25, 1993

[30] Foreign Application Priority Data

Aug. 19, 1992 [JP] Japan .................................. 4-242771

[51] Int. Cl.$^5$ ...................... C09K 19/32; C09K 19/20; C07C 69/76
[52] U.S. Cl. ........................... 252/299.62; 252/299.01; 252/299.67; 560/59; 560/63; 560/65; 560/86; 560/89; 560/100
[58] Field of Search ....................... 252/299.01, 299.62, 252/299.67; 560/59, 63, 65, 86, 89, 100

[56] References Cited

U.S. PATENT DOCUMENTS

| | | | |
|---|---|---|---|
| 4,921,632 | 5/1990 | Nakamura et al. | 252/299.1 |
| 4,973,738 | 11/1990 | Suzuki et al. | 252/299.6 |
| 5,141,668 | 8/1992 | Nishiyama et al. | 252/299.62 |

FOREIGN PATENT DOCUMENTS

| | | |
|---|---|---|
| 0334628 | 9/1989 | European Pat. Off. . |
| 0339987 | 11/1989 | European Pat. Off. . |
| 0341922 | 11/1989 | European Pat. Off. . |
| 0413585 | 2/1991 | European Pat. Off. . |
| 0465048 | 1/1992 | European Pat. Off. . |
| 1213390 | 8/1989 | Japan . |
| 1316339 | 12/1989 | Japan . |
| 1316367 | 12/1989 | Japan . |
| 1316372 | 12/1989 | Japan . |
| 240625 | 9/1990 | Japan . |
| 87006577 | 11/1987 | PCT Int'l Appl. . |

OTHER PUBLICATIONS

E. Chin, J. W. Goodby, "Molecular Crystals and Liquid Crystals" (Inc. Nonlinear Optics), vol. 141, 1986, pp. 311-320, Protection-Deprotection Method for the Synthesis of Substituted Benzoyloxybenzoates.

*Primary Examiner*—Shean Wu
*Attorney, Agent, or Firm*—Cushman, Darby & Cushman

[57] ABSTRACT

Disclosed are novel liquid crystal compounds containing a naphthalene ring, having an excellent light leaking ratio at tristable states, and represented by the following formula:

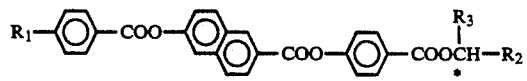

wherein $R_1$ is a $C_6$-$C_{16}$ linear alkyl group or $C_6$-$C_{16}$ linear alkoxy group, $R_2$ is a $C_4$-$C_{12}$ linear alkyl group, $R_3$ is a $C_1$-$C_3$ alkyl group or $C_1$-$C_3$ haloalkyl group, and C having an asterisk indicates an asymmetric atom.

The liquid crystal compounds are expected to find their applications in electrooptical devices and liquid crystal displays utilizing a $S^*_{(3)}$ liquid crystal phase which shows tristable states.

7 Claims, 10 Drawing Sheets

APPLIED TRIANGLE WAVE VOLTAGE

OPTICAL RESPONSE OF NEMATIC LIQUID CRYSTAL ON MARKET

OPTICAL RESPONSE OF LIQUID CRYSTAL HAVING IDEAL BISTABLE STATES

OPTICAL RESPONSE OF LIQUID CRISTAL HAVING TRISTABLE STATES OF PRESENT INVENTION

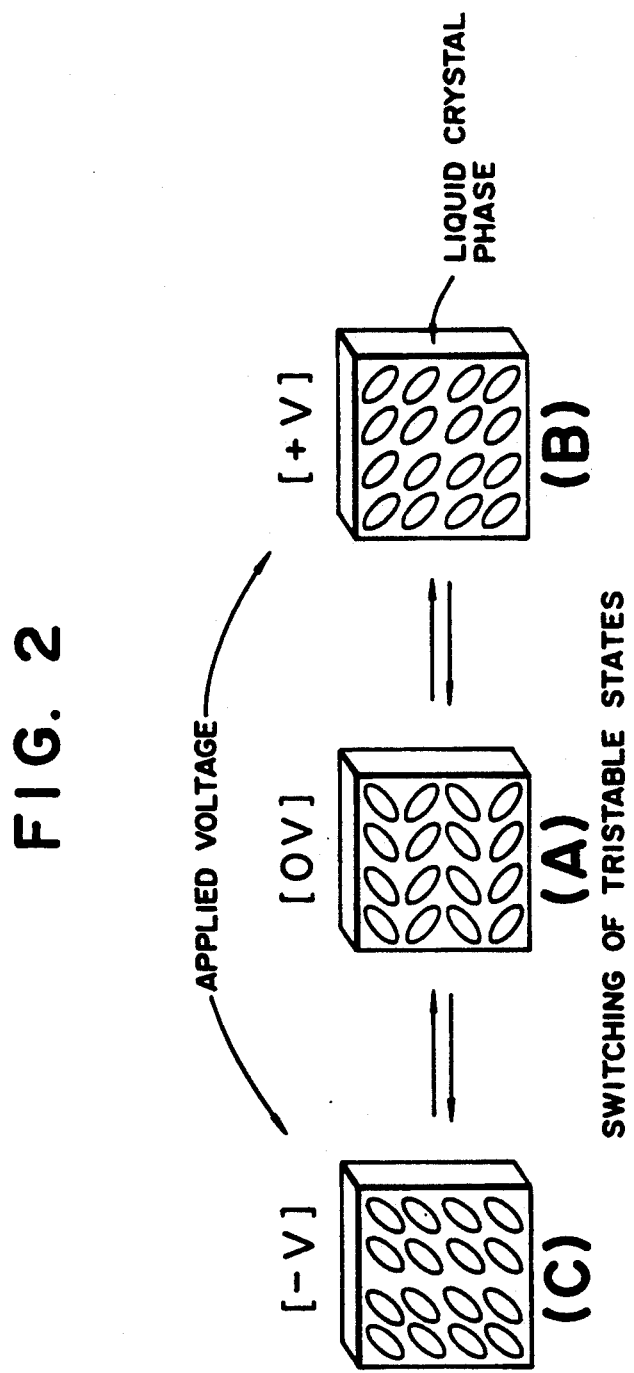

CHARACTERISTIC OF VOLTAGE-RELATIVE LIGHT TRANSMITTANCE

EXPLANATION OF LIGHT LEAKING RATIO

LIQUID CRYSTAL COMPOUND

FIELD OF THE INVENTION

The present invention relates to a liquid crystal compound which can suitably be used for an electrooptical device utilizing the response of a chiral smectic liquid crystal to electric fields. Particularly, the present invention relates to a ferroelectric liquid crystal compound containing a naphthalene ring. Further, the present invention relates to an antiferroelectric liquid crystal compound having tristable states and having an excellent light leaking ratio.

Unless otherwise specified, the term "liquid crystal compound" as used in the present specification is intended to have the meanings of liquid crystal compound, and composition or substance comprising the liquid crystal compound.

BACKGROUND OF THE INVENTION

The meaning of the term "tristable state" as used in the present specification is explained as follows:

An electrooptical device is constructed in which a liquid crystal is laid between a first electrode substrate and a second electrode substrate which is apart at a given space from the first substrate. A triangular wave voltage as shown in FIG. 1 (A) is applied to the first and second electrode substrates. Then, the liquid crystal shows a molecular orientation of the first stable state (as shown in FIG. 2 at reference point (A)) and also shows a first stable state in the transmittance (as shown in FIG. 1 (D) at reference numeral 2) in an electrooptical apparatus where no electric field is applied. However, upon application of electric field, the liquid crystal shows another molecular orientation of a second stable state (as shown in FIG. 2 at reference point (B)) which is different from the first stable state and also shows a second stable state in the transmittance (as shown in FIG. 1 (D) at reference numeral 1) in an electrooptical apparatus in one of electric field directions. Further, the liquid crystal shows still another molecular orientation of a third stable state (as shown in FIG. 2 at reference point (C)) which is different from the first and second stable states and also shows a third stable state in the transmittance (as shown in FIG. 1 (D) at reference numeral 3) in an electrooptical apparatus in the other direction of the electric field.

Liquid crystal display elements have been developed and commercially used to date due to their excellent performances or characteristics such as low working voltage, small power consumption, small thickness (thin display), and light passive (not-luminicent) nature under a TN, STN, or Guest-Host system. However, liquid crystal display elements using a nematic liquid crystal which is now widely being employed have a defect that response time is as slow as several micro seconds to several tens of micro seconds leading to a restriction in their applications.

In order to solve the problems, an active-matrix drive system using a STN system or thin-film transistor was developed. However, such other problems have happened that strict accuracy is required in controlling a cell gap and tilt angle and that the response is rather slow while the qualities of display contrast and viewing angle have become excellent through the use of the STN display element.

The thin-film transistor has defects that the yield at its manufacturing is low and that the manufacturing cost is high.

Accordingly, it was demanded to develop a new type of liquid crystal display elements having an improved response and experiments had been carried out to develop a ferroelectric liquid crystal from which a hypervelocity device can be prepared having an extremely short optical response time at an order of $\mu$sec.

With the object of preparing a ferroelectric liquid crystal, Mayer et al. synthesized DOBAMBC (p-decyloxybenzilidene-p-ammino-2-methylbutyl cinnamate) in 1975 for the first time in the world and DOBAMBC was confirmed to be a ferroelectric liquid crystal (Le Journal de Physique, Vol. 36, 1975, L-69).

Further, since Clark and Lagawall reported in 1980 on such characteristics on display devices as high velocity response of submicroseconds and memory characteristics of DOBAMBC, ferroelectric liquid crystals have attracted considerable public attention (N. A. Clark et al., Appl. Phys. Lett. 36, 899 (1980)).

However, there were many technical problems in their system for practical use. Particularly, there was not any material showing ferroelectric liquid crystallinity at an ambient temperature, and effective and practical method was not established to control the molecular alignment of liquid crystal which is essential for a display device, either.

After the publication of the report, various attempts have been made from both aspects of liquid crystal materials and device, display devices utilizing the switching between twisted bistable states were prepared for trial, and a high speed electrooptical apparatus using the switching between twisted bistable states is proposed in Tokkai Sho 56-107216 and others. However, high contrast and proper potential of threshold value have not been obtained.

From such a point of view, switching systems were explored to propose a transitional diffusion system. Subsequently, a switching system using a liquid crystal having tristable states was reported in 1988 (A. D. L. Chandani, T. Hagiwara, Y. Suzuki et al., Japan. J. of Appl. Phys., 27, (5), L729–L732 (1988)).

Antiferroelectric liquid crystal compounds which have a liquid crystal phase $S*_{(3)}$ and show the tristable states in the phase are disclosed in Tokkai Hei 1-213390, 1-316367, 1-316372, 1-316339, and 2-28128. The disclosures of all of which are incorporated herein by reference.

Also, liquid crystal electrooptical apparatuses utilizing the tristable states are proposed in Tokkai Hei 2-40625, 2-153322, and 2-173724.

An antiferroelectric liquid crystal having a good memory effect and exhibiting the tristable states has not yet been reported in a publication.

The switching system of the tristable states employs hysteresis characteristic and a definite threshold potential of a voltage at which a molecular alignment of a liquid crystal shows a change by a driving voltage in a liquid crystal phase $S*_{(3)}$ where the liquid crystal shows the tristable states which is basically different from the conventional bistable states. The switching system using the tristable states can be considered as an epochmaking driving method by which a display of moving large pictures can be realized by a single matrix system.

Further, the performances of a display element using a liquid crystal showing the tristable states will largely depend on the shape of hysteresis curve which is an inherent physical property of the tristable-states liquid crystal. While an ideal dark state can be realized in the hysteresis showing the hysteresis curve as shown in FIG. 3 at 0 volt, light leaking will occur when the voltage was increased from 0 volt to $+V_1$, or the voltage was decreased from 0 volt to $-V_1$. The liquid crystal showing such a hysteresis curve and showing the tristable states can be said to have a poor memory effect at the dark state. And the phenomenon will bring about a decrease in contrast of display elements.

On the other hand, an ideal dark state realized at 0 volt is kept to a voltage $V_3$ or $-V_3$ in a hysteresis curve as shown in FIG. 4 and thus, the liquid crystal can be said to have a good memory effect at a dark state. The contrast of display elements are also good.

However, it is impossible to actually obtain a liquid crystal compound showing such an ideal hysteresis curve as shown in FIG. 4. Almost all liquid crystals show a light leakage when the voltage is increased from 0 volt to $V_1$ volt, or the voltage is decreased from 0 volt to $-V_1$ volt. At $\pm V_1$ volt, light leaking ratio reaches 5 to 10%. It has been very difficult to find a liquid crystal compound showing a light leaking ratio of 0 to 5% at $\pm V_1$ volt when a liquid crystal compound shows a hysteresis curve as shown in FIG. 5 and when bias voltage is expressed by the following equation:

Bias voltage $V_{bo} = (V_2 + V_3) \times \frac{1}{2}$ and light leaking ratio is defined as $[(C) \times 1/(D)] \times 100$.

SUMMARY AND OBJECTS OF THE PRESENT INVENTION

An object of the present invention is to provide a novel liquid crystal compound containing a naphthalene ring and having an excellent light leaking ratio applications of which compound can be expected in new electrooptical elements and liquid crystal displays utilizing a liquid crystal phase $S^*_{(3)}$ where the liquid crystal compound shows tristable states.

The present invention relates to a liquid crystal compound having a excellent light leaking ratio at tristable states and represented by the following formula:

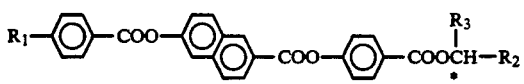

wherein $R_1$ is a $C_6$–$C_{16}$ linear alkyl group or $C_6$–$C_{16}$ linear alkoxy group, $R_2$ is a $C_4$–$C_{12}$ linear alkyl group, $R_3$ is a $C_1$–$C_3$ alkyl group or $C_1$–$C_3$ haloalkyl group, and C having an asterisk indicates an asymmetric atom.

Examples of the haloalkyl groups include $CF_3$, $CHF_2$, $CH_2F$, $CH_2CF_3$, $C_2F_5$, $CCl_2CF_3$, $CCl_3$, $C_2Cl_5$, and $C_3F_7$.

Liquid crystal elements using the liquid crystal compound of the present invention provide good display contrast due to low light leaking ratio of the liquid crystal compound.

BRIEF DESCRIPTION OF THE FIGURES

FIG. 2, at reference point (A), shows the molecular orientation of a liquid crystal in a first stable state. FIG. 2, at reference point (B), shows the molecular orientation of a liquid crystal upon application of an electric field wherein the orientation is in a second stable state which is different from the first stable state in FIG. 2 at reference point (A). FIG. 2, at reference point (C), shows another molecular orientation of the liquid crystal to a third stable state which is different from the first and second stable state.

In FIGS. 4 to 10, the ordinates show light transmittance and the abscissas show wave number.

DETAILED DESCRIPTION OF THE INVENTION

Figure 1A:
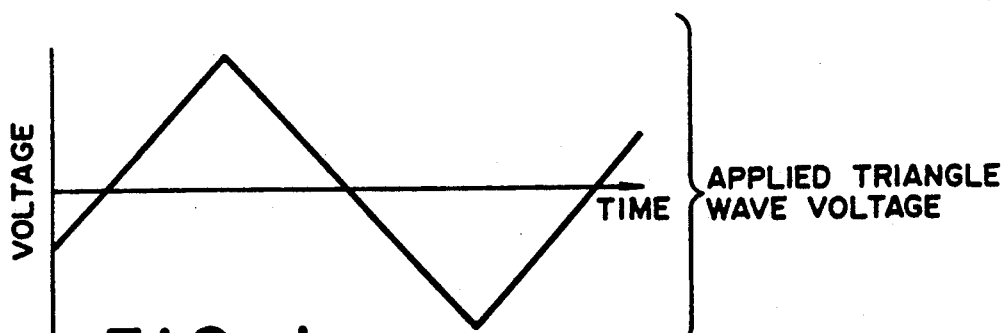
FIG. 1 (A) shows an applied triangular wave voltage, and FIGS. (B), (C) and (D) show optical response characteristics of a nematic liquid crystal on the market, of a liquid crystal showing bistable states, and of a liquid crystal showing tristable states, respectively.
Figure 1B:
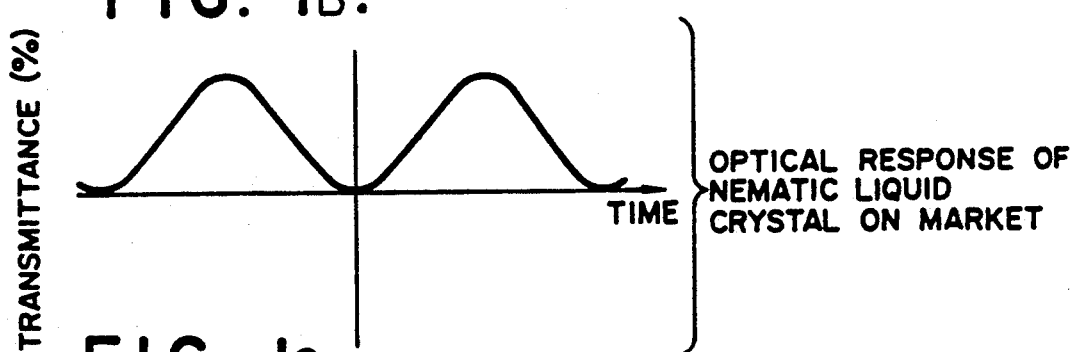
Figure 1C:
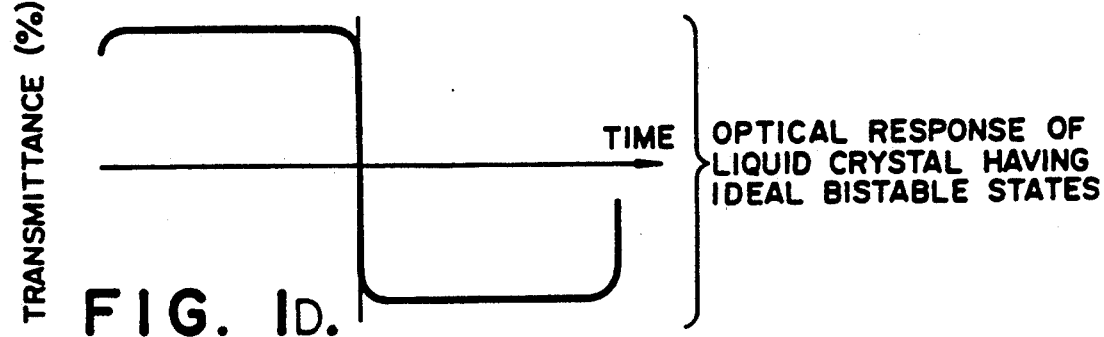
Figure 1D:
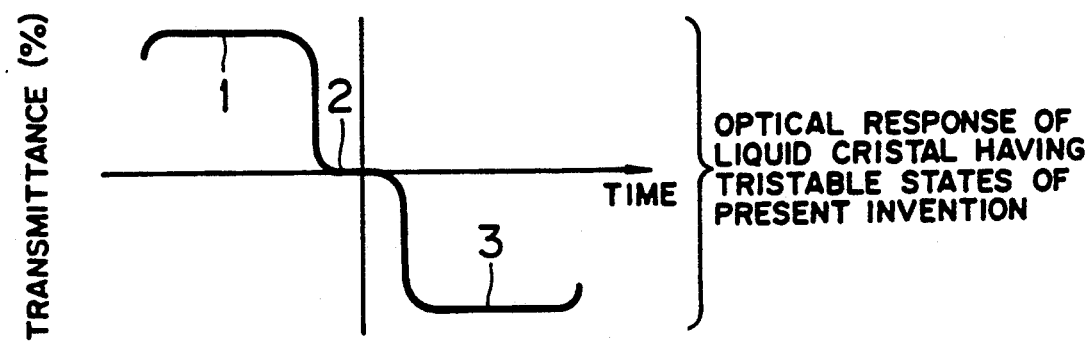
Figure 3:
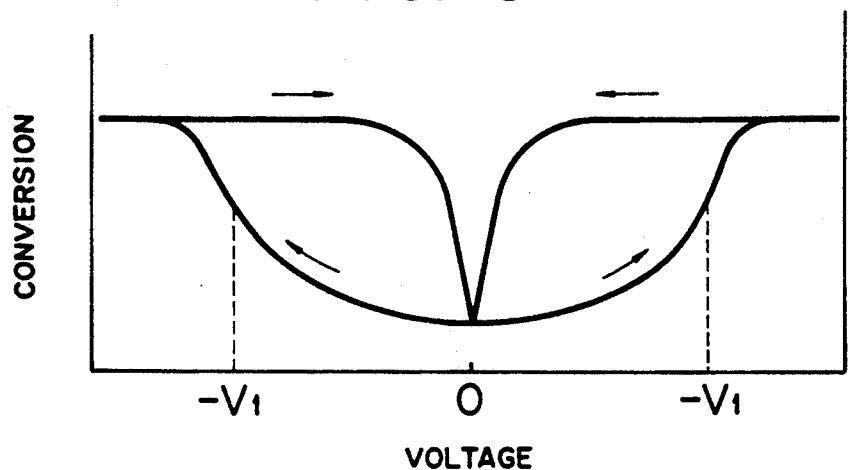
FIG. 3 shows a hysteresis curve of a liquid crystal showing tristable states and having a poor memory effect at a dark state.

The disclosed novel liquid crystal compounds contain a naphthalene ring, have an excellent light leaking ratio set tristable states, and are represented by the following formula:

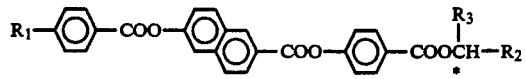

wherein $R_1$ is a $C_6$–$C_{16}$ linear alkyl group or $C_6$–$C_{16}$ linear alkoxy group, $R_2$ is a $C_4$–$C_{12}$ linear alkyl group, $R_3$ is a $C_1$–$C_3$ alkyl group or $C_1$–$C_3$ haloalkyl group, and the C having an asterisk indicates an asymmetric atom.

These liquid crystal compounds are expected to find application in electrooptical devices and liquid crystal displays utilizing a $S^*_{(3)}$ liquid crystal phase which shows tristable states.

A specific example of the method for synthesizing a liquid crystal compound of the present invention will be explained as follows:

(1) With 4-alkyl or alkoxy benzoic acid chloride, 6-hydroxy-2-naphthoic acid is reacted in the presence of triethylamine to obtain 6-(4-alkyl or alkoxy phenylcarbonyloxy)-2-naphthoic acid. Then, it is converted into 6-(4-alkyl or alkoxy phenylcarbonyloxy)-2-naphthoic acid chloride by means of an excess amount of thionyl chloride.

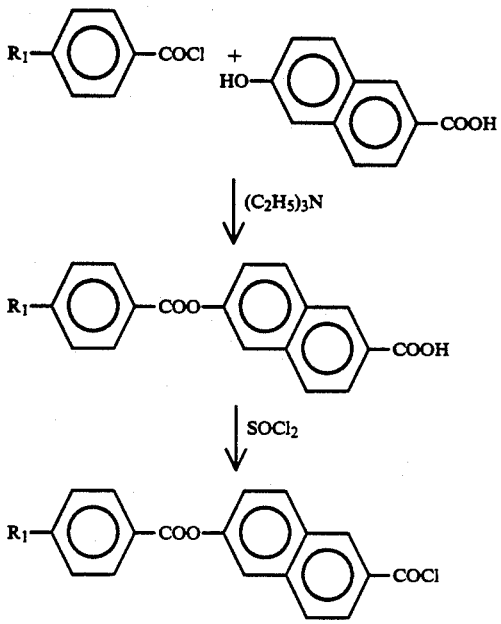

(2) With optically active 1,1,1-trifluoro-2-alkanol, 4-benzyloxybenzoic acid chloride is reacted in the presence of triethylamine to obtain 4-benzyloxyphenyl-4'-carboxylic acid 1,1,1-trifluoro-2-alkyl ester. Then, it is converted into 4-hydroxyphenylcarboxylic acid 1,1,1-trifluoro-2-alkyl ester through hydrogenation.

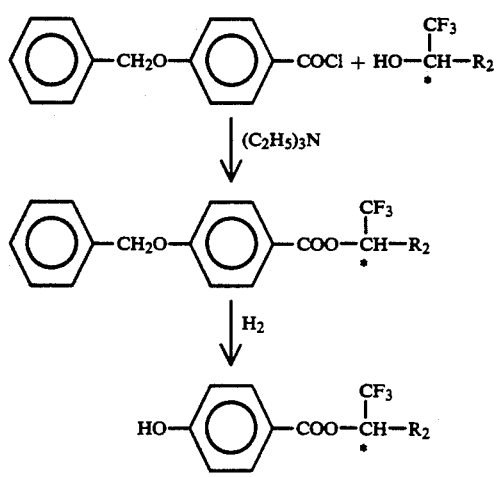

(3) The chloride prepared in (1) above is reacted with the phenol prepared in (2) above in the presence of triethylamine to obtain 6-(4-alkyl or alkoxy phenylcarbonyloxy)-2-naphthoic acid 4-(1,1,1-trifluoro-2-alkyloxycarbonyl)phenyl ester.

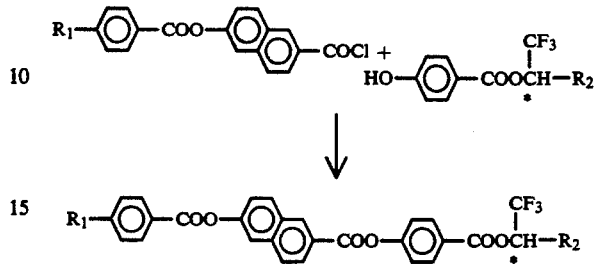

According to the present invention, display devices having an excellent contrast can be provided since the novel liquid crystal compound of the present invention shows a stable three stages and has a low and excellent light leaking ratio.

EXAMPLE

The present invention will now be described in further detail with reference to Examples. However, it should be understood that the present invention is by no means restricted by such specific Examples.

EXAMPLE 1

Synthesis of 6-(4-octyloxyphenylcarbonyloxy)-2-naphthoic acid 4-(1,1,1-trifluoro-2-octyloxycarbonyl) phenyl ester

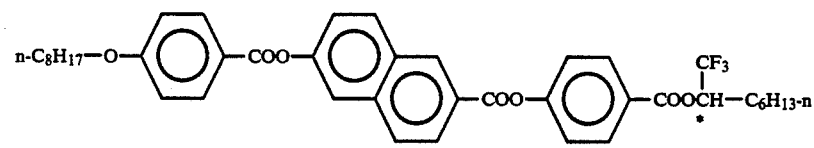

1) Synthesis of 6-(4-octyloxyphenylcarbonyloxy)-2-naphthoic acid chloride

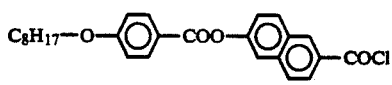

In 30 ml of dichloromethane, 3 g of 6-hydroxy-2-naphthoic acid and 2.4 g of triethylamine were dissolved. To this solution were added 4.4 g of 4-octyloxybenzoic acid chloride and 0.2 g of dimethylaminopyridine, and the solution was stirred for about 20 hours at an ambient temperature. A diluted hydrochloric acid solution was added to the solution and the organic layer in the mixed solution was separated by means of a separating funnel. After the solvent was distilled off, the residue was washed with n-hexane and dried to obtain 5.9 g of 6-(4-octyloxyphenylcarbonyloxy)-2-naphthoic acid. The compound was added in 10 g of thionyl chloride to dissolve, and a very small amount of N,N-dimethyl formamide was added to the solution and the solution was refluxed for 4 hours. An excess amount of thionyl chloride was distilled off to obtain 5.7 g of the titled compound.

2) Synthesis of 1,1,1-trifluoro-2-octyl 4-benzyloxybenzoate

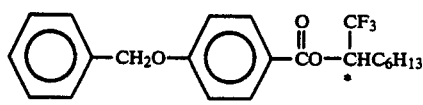

To 40 ml of methylene chloride were added 3.7 g of (R)-(+)-1,1,1-trifluoro-2-octanol (optical purity: 96:1% ee) and 1.2 g of triethylamine, and then 4.3 g of 4-benzyloxybenzoic acid chloride dissolved in 40 ml of methylene chloride was dropped into the solution with stirring. Further, 0.5 g of dimethylaminopyridine was added into the solution and the solution was stirred for a whole day and night at an ambient temperature. After that, the reaction liquid was put into a water tank. The methylene chloride layer was separated and the lalyer was washed with diluted hydrochloric acid, water, 1N aqueous sodium carbonate solution and water in this order, then dried over anhydrous magnesium sulfate and distilled off the solvent to obtain a crude desired compound. The compound was purified by toluene-/silicagel chromatography and recrystallization from ethanol to obtain the pure titled compound.

3) Synthesis of 1,1,1-trifluoro-2-octyl 4-hydroxybenzoate

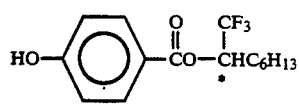

In 15 ml of ethanol, 1.8 g of 1,1,1-trifluoro-2-octyl 4-benzyloxybenzoate was added to dissolve, and 0.36 g of Pd-carbon was added. The liquid was stirred for a whole day and night under hydrogen atmosphere at an ambient temperature. After the Pd-carbon was removed by filtration, the solvent was distilled off to obtain 1.4 g of the titled compound.

4) Synthesis of 6-(4-octyloxyphenylcarbonyloxy)-2-naphthoic acid 4-(1,1,1-trifluoro-2-octyloxycarbonyl)-phenyl ester

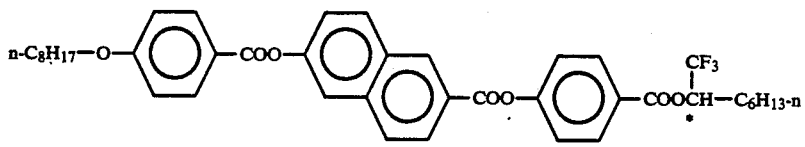

In 30 ml of methylene chloride, a mixture of 0.5 g of 1,1,1-trifluoro-2-octyl 4-hydroxybenzoate prepared in 3) above and 0.16 g of triethylamine was dissolved. To this solution was dropped little by little 0.7 g of 6-(4-octyloxyphenyl-carbonyloxy)-2-naphthoic acid chloride prepared in 1) above in 30 ml of methylene chloride. Further, 0.05 g of dimethylaminopyridine was added into the solution, and the solution was stirred for a whole day and night at an ambient temperature.

The reaction mixture was put into water, the solution was adjusted to neutral, and the methylene chloride layer in the solution was separated. After drying the methylene chloride separated over anhydrous magnesium sulfate, methylene chloride was distilled off. The residue was purified by silica gel chromatography (developing solvent: hexane/ethyl acetate =20/1) to obtain 0.7 g of the titled compound.

Figure 6:
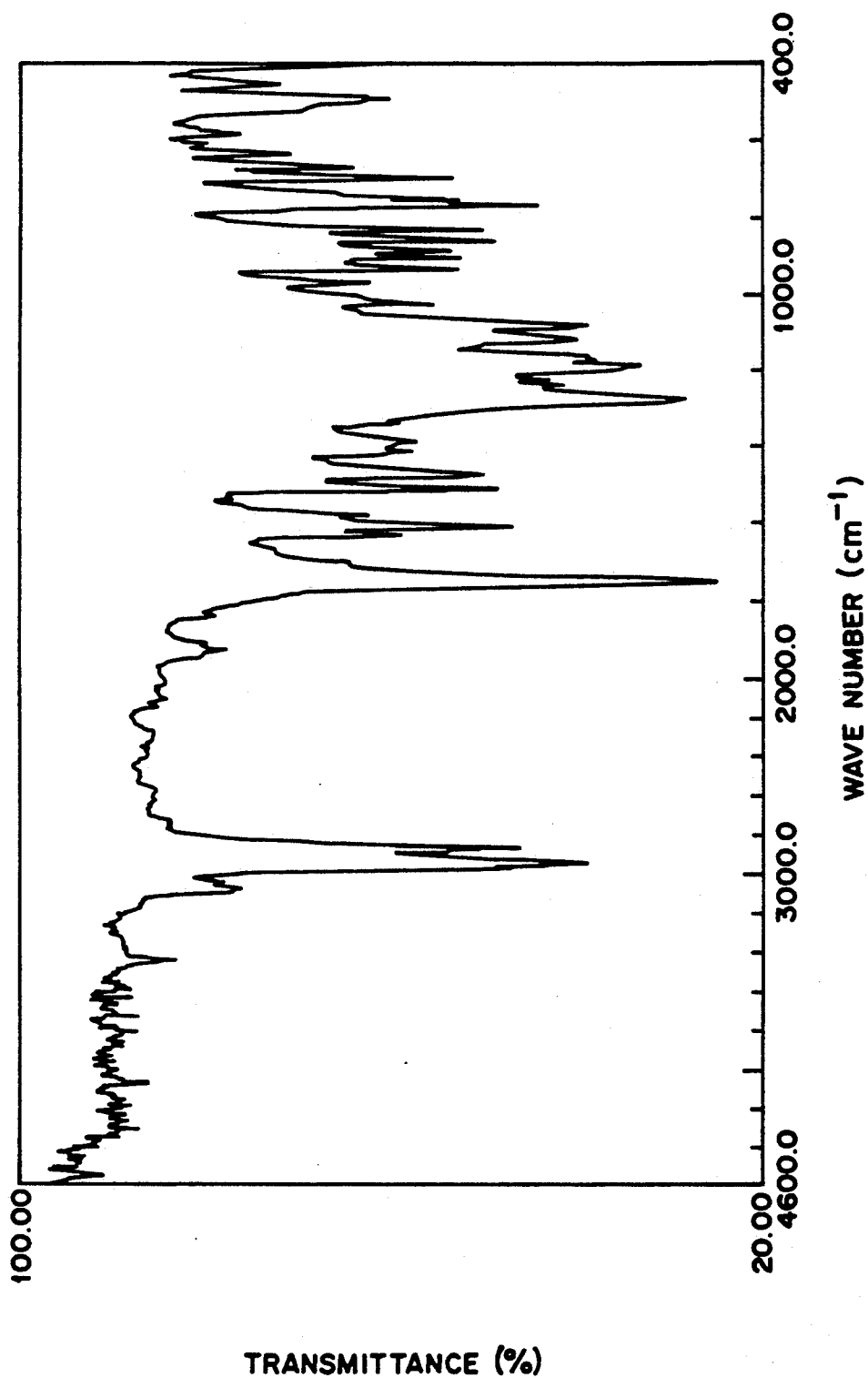
FIG. 6 shows an infrared absorption spectrum of a liquid crystal compound prepared in Example 1 of the present invention.

The phase transition temperatures of the compound observed with a polarizing microscope equipped with a hot stage were as follows:

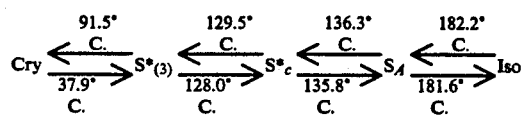

wherein $S^*_{(3)}$ indicates a liquid crystal phase having the tristable states, $S^*_c$ indicates a smectic C phase, and $S_A$ indicates a smectic A phase, respectively. The infrared absorption spectrum of the titled compound is shown in FIG. 6.

EXAMPLE 2

Synthesis of 6-(4-nonyloxyphenylcarbonyloxy)-2-naphthoic acid 4-(1,1,1-trifluoro-2-decyloxycarbonyl) phenyl ester

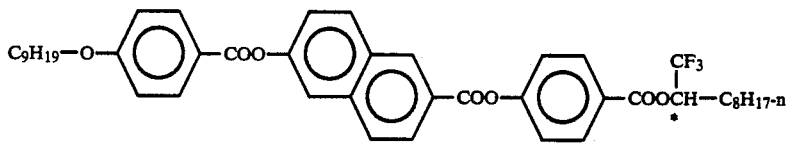

Example 1 was repeated except that 5.0 g of 4-nonyloxybenzoic acid chloride was used instead of 4-octyloxybenzoic acid chloride in Example 1, 1) and 4.6 g of R-(+)-1,1,1-trifluoro-2-decanol (optical purity: 98.0% ee) was used instead of (R)-(+)-1,1,1-trifluoro-2-octanol in Example 1, 2).

The phase transition temperatures of the resulting compound observed with a polarizing microscope equipped with a hot stage were as follows:

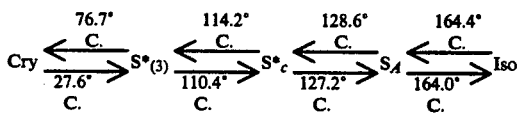

Figure 7:
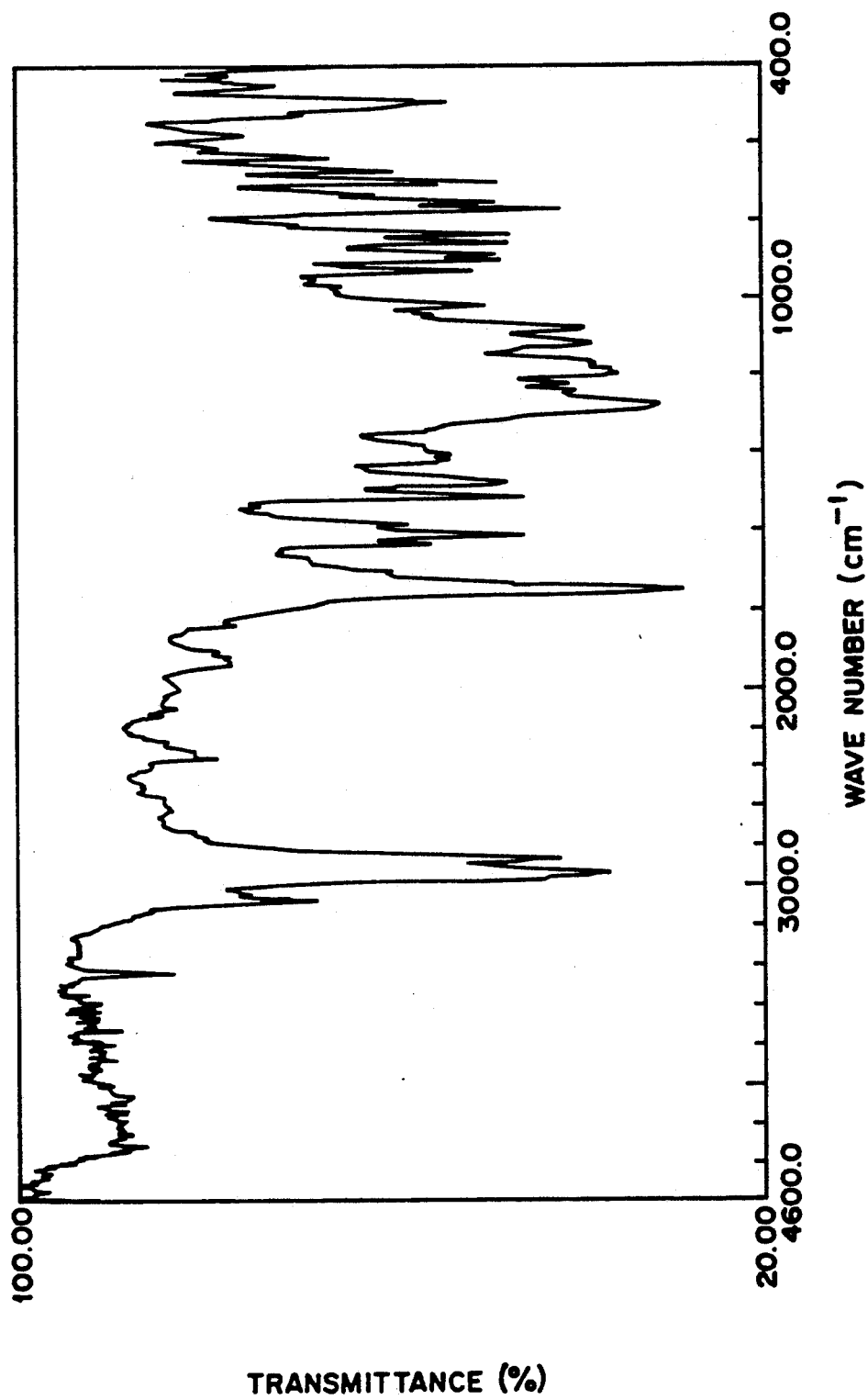
FIG. 7 shows an infrared absorption spectrum of a liquid crystal compound prepared in Example 2 of the present invention.

The infrared absorption spectrum of the titled compound is shown in FIG. 7.

EXAMPLE 3

Synthesis of 6-(4-decyloxyphenylcarbonyloxy)-2-naphthoic acid 4-(1,1,1-trifluoro-2-octyloxycarbonyl) phenyl ester

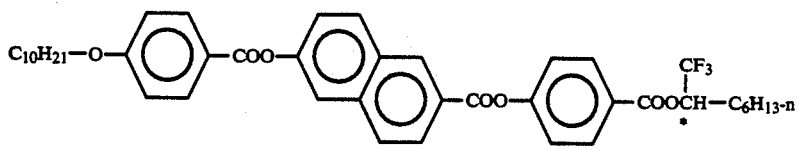

Example 1 was repeated except that 5.5 g of 4-decanoyloxybenzoic acid chloride was used instead of 4-octyloxybenzoic acid chloride in Example 1, 1) to obtain the titled compound.

The phase transition temperatures of the resulting compound observed with a polarizing microscope equipped with a hot stage were as follows:

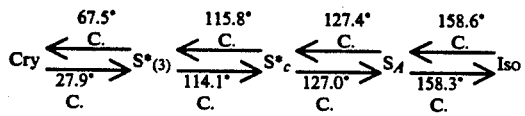

Figure 8:
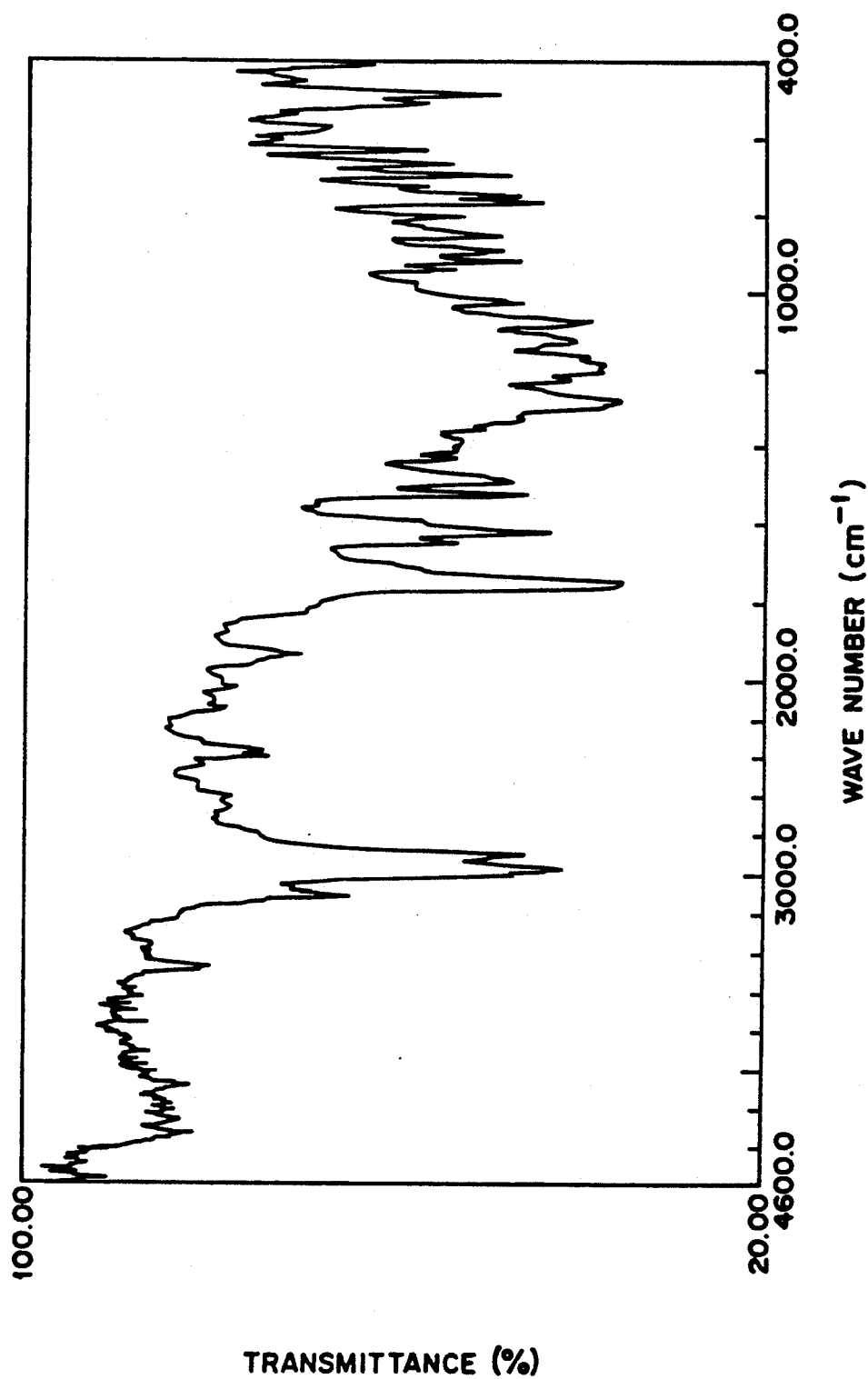
FIG. 8 shows an infrared absorption spectrum of a liquid crystal compound prepared in Example 3 of the present invention.

The infrared absorption spectrum of the titled compound is shown in FIG. 8.

EXAMPLE 4

Synthesis of 6-(4-octyloxyphenylcarbonyloxy)-2-naphthoic acid 4-(1,1,1-trifluoro-2-decyloxycarbonyl) phenyl ester

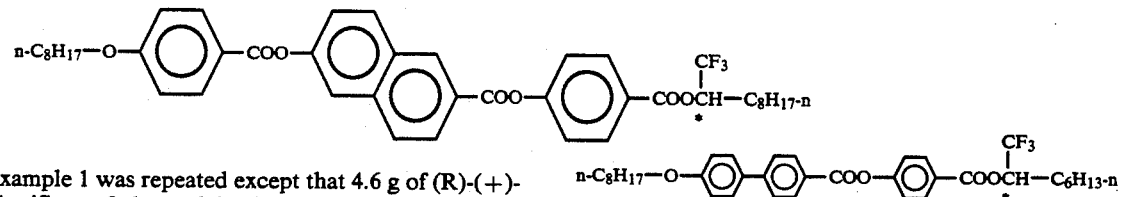

Example 1 was repeated except that 4.6 g of (R)-(+)-1,1,1-trifluoro-2-decanol (optical purity: 98.0% ee) was used instead of (R)-(+)-1,1,1-trifluoro-2-octanol in Example 1, 2) to obtain the titled compound.

The phase transition temperatures of the resulting compound observed with a polarizing microscope equipped with a hot stage were as follows:

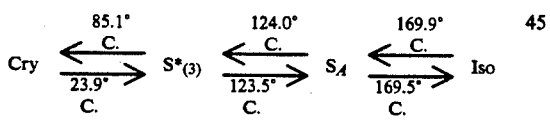

Figure 9:
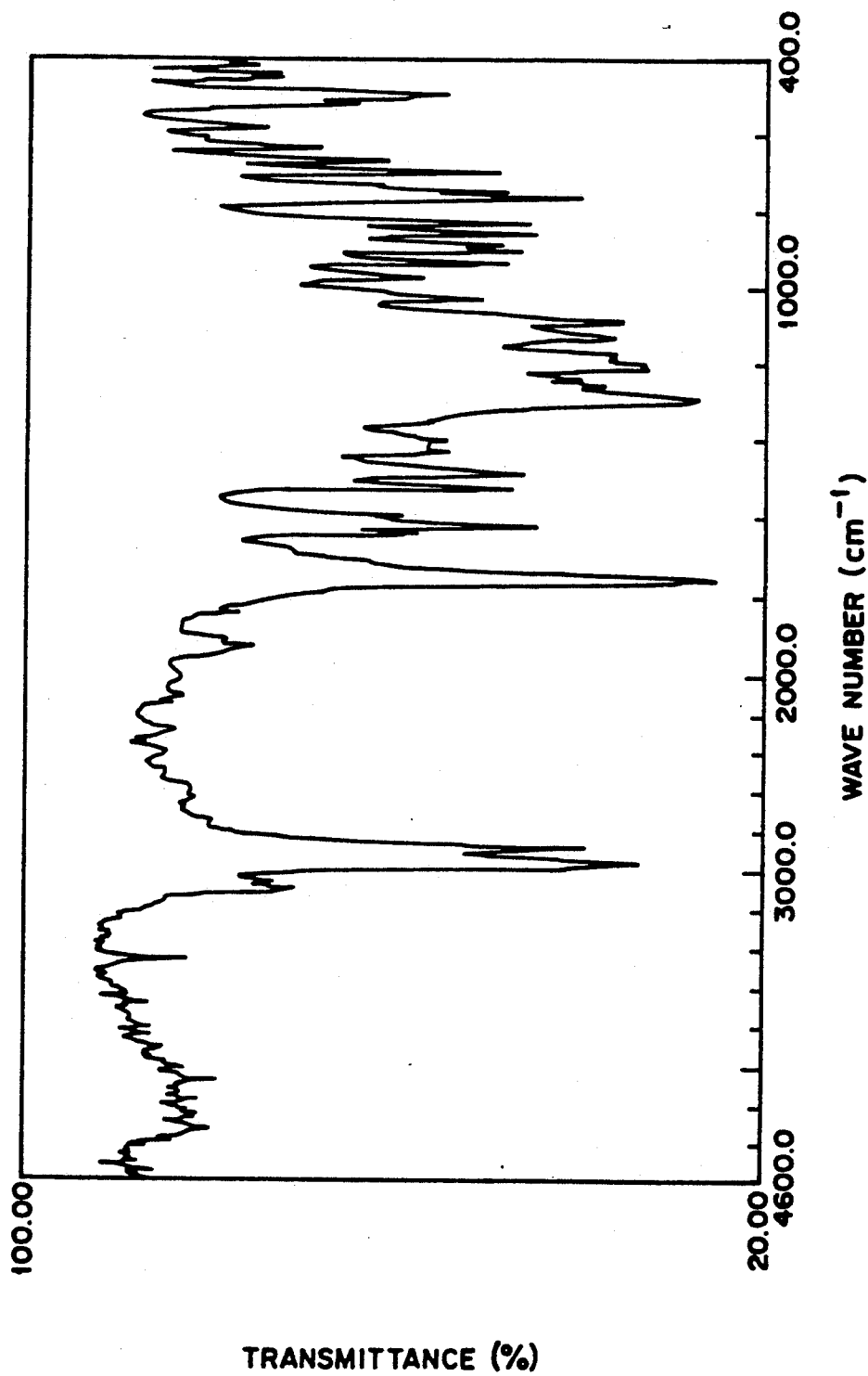
FIG. 9 shows an infrared absorption spectrum of a liquid crystal compound prepared in Example 4 of the present invention.

The infrared absorption spectrum of the titled compound is shown in FIG. 9.

EXAMPLE 5

Synthesis of 6-(4-decyloxyphenylcarbonyloxy)-2-naphthoic acid 4-(1,1,1-trifluoro-2-decyloxycarbonyl) phenyl ester

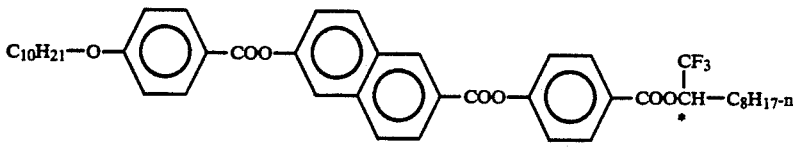

Example 1 was repeated except that 4.6 g of (R)-(+)-1,1,1-trifluoro-2-decanol (optical purity: 98.0% ee) was used instead of (R)-(+)-1,1,1-trifluoro-2-octanol in Example 1, 2) and 5.5 g of 4-decanoyloxybenzoic acid chloride was used instead of 4-octyloxybenzoic acid chloride in Example 1, 1) to obtain the titled compound.

The phase transition temperatures of the resulting compound observed with a polarizing microscope equipped with a hot stage were as follows:

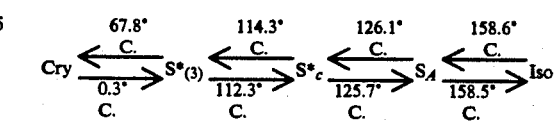

Figure 10:
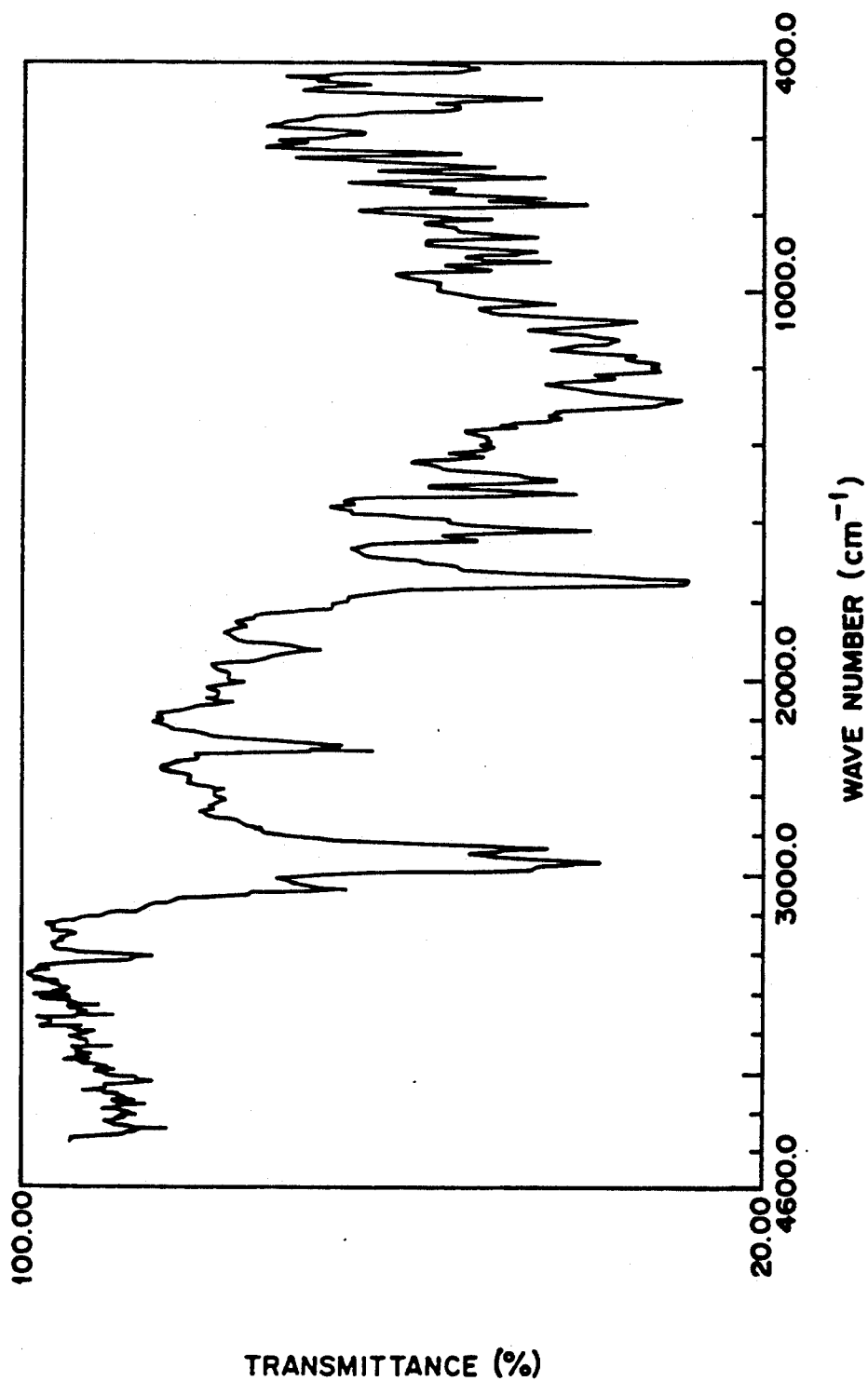
FIG. 10 shows an infrared absorption spectrum of a liquid crystal compound prepared in Example 5 of the present invention.

The infrared absorption spectrum of the titled compound is shown in FIG. 10.

COMPARATIVE EXAMPLE

Synthesis of 4-(1,1,1-trifluoro-2-octyloxycarbonyl)phenyl 4'-n-octyloxybiphenyl-4-carboxylate

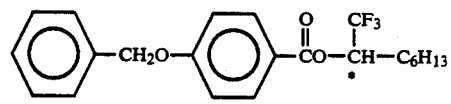

1) Synthesis of 1,1,1-trifluoro-2-octyl 4-benzyloxybenzoate

To a solution of 4.3 g of 4-benzyloxybenzoic acid chloride in 50 ml of methylene chloride was added drop by drop a solution of 2.9 g of (R)-(+)-1,1,1-trifluoro-2-octanol, 0.6 g of dimethylaminopyridine, and 1.7 g of triethylamine in 50 ml of methylene chloride under ice cooling. The mixture was left to stand at an ambient temperature for 24 hours before being poured in ice water. The methylene chloride layer was separated, washed with diluted hydrochloric acid solution, water, 1N aqueous sodium carbonate solution, and water in this order, dried over magnesium sulfate, and distilled to obtain a crude titled compound. The compound was purified by toluene/silica gel chromatography and recrystallization from ethanol to obtain 3.8 g of the titled compound.

2) Synthesis of 1,1,1-trifluoro-2-octyl 4-hydroxybenzoate

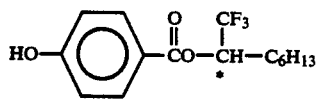

To a solution of 3.8 g of the compound obtained in 1) above in 100 ml of methanol was added 0.4 g of carbon on which 10% Pd was carried. The mixture was subjected to hydrogenation in an atmosphere of hydrogen to obtain 2.8 g of the titled compound.

3) Synthesis of 4-(1,1,1-trifluoro-2-octyloxycarbonyl) phenyl 4'-n-octyloxybiphenyl-4-carboxylate

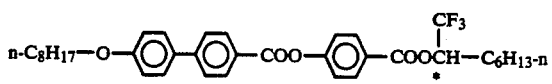

With an excess amount of thionyl chloride, 4.0 g of 4-n-octyloxybiphenyl carboxylic acid was heated under refluxing for 6 hours. Unaltered thionyl chloride was distilled off to obtain 4-n-octyloxybiphenyl carboxylic acid chloride.

To a solution of the acid chloride in 50 ml of methylene chloride was added 2.8 g of a solution of 1,1,1-trifluoro-2-octyl 4-hydroxybenzoate obtained in 2) above, 1.0 g of triethylamine, and 0.3 g of dimethylaminopyridine in 50 ml of methylene chloride under ice cooling. The mixture was left to stand at an ambient temperature for 24 hours. The reaction product was poured in ice water. The methylene chloride layer separated was washed with diluted hydrochloric acid solution, water, 1N aqueous solution of sodium carbonate and water in this order, dried over sodium sulfate, and subjected to distillation. The product was purified by toluene/silica gel chromatography to obtain 2.1 g of a product which was further purified by recrystallization from absolute ethanol to obtain the titled compound.

The phase transition temperatures of the resulting compound observed with a polarizing microscope equipped with a hot stage were as follows:

$$\text{Cry} \xleftarrow{74°\text{C.}} S^*_{(3)} \xleftarrow{114°\text{C.}} S^*_c \xleftarrow{115°\text{C.}} S_A \xleftarrow{123.4°\text{C.}} \text{Iso}$$

EXAMPLE 6

Each of liquid crystal compounds obtained by Examples was filled in an isotropic phase to a liquid crystal cell having a cell thickness of 1.6 μm and having a rubbed polyimide alignment film on ITO (indium-tin-oxide) electrode substrates to prepare liquid crystal thin film cells.

Each of the liquid crystal cells thus prepared was arranged on a polarizing microscope equipped with a photomultiplier where two polarizing plates are orthogonally arranged each other, in such a state that a molecular parallel axis and a polarizer overlap one another when −40V direct voltage was applied.

The liquid crystal cell was slowly cooled down to the $S_A$ phase at a temperature gradient of 0.1° to 1.0° C./min. The cell was further cooled down and applied with a triangular wave voltage of ±40 volt and 1 $H_z$ at a temperature within a range where the liquid crystal takes the $S^*_{(3)}$ phase.

Figure 11A:
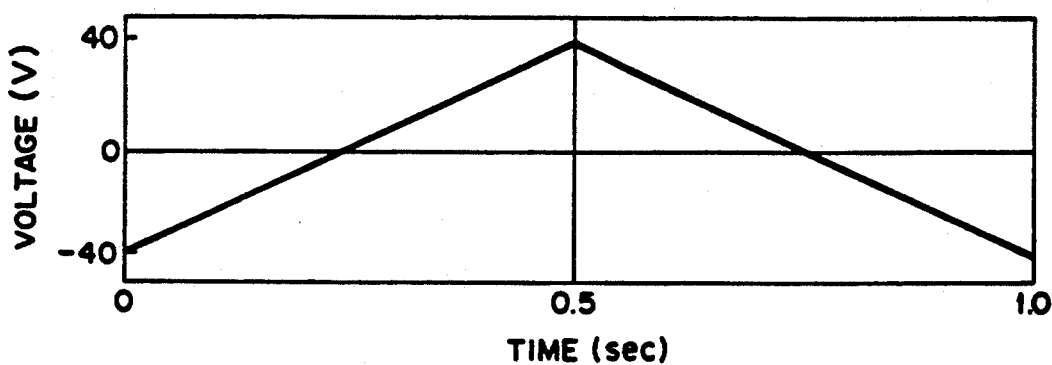
FIG. 11 (A) shows a characteristic of triangular wave voltage applied in Example 6, and FIGS. 11 (B) and (C) show hysteresis curves of light transmittance according to the change in applied triangular wave voltage for liquid crystal compounds prepared in Example 1 and the comparative Example, respectively.
Figure 11B:
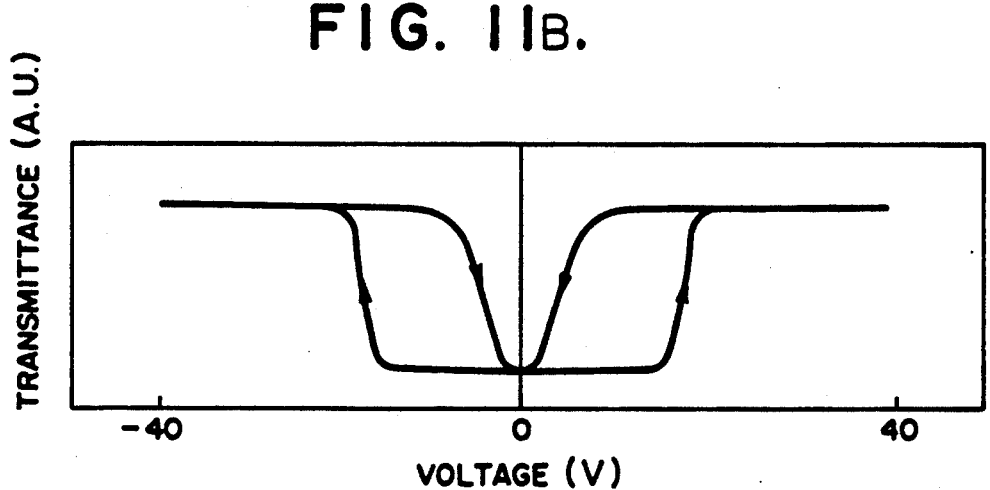
Figure 11C:
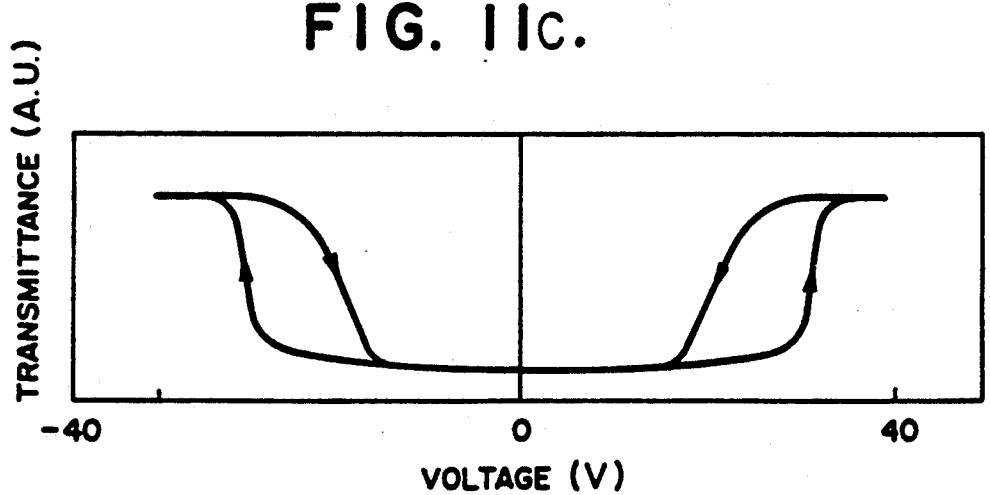

FIG. 11 (A) shows a triangular wave voltage, and FIG. 11 (B) and (C) show hysteresis curves which were obtained using the liquid crystals prepared in Example 1 and Comparative Example, respectively. From the hysteresis curves thus obtained, the following threshold voltage were obtained (see FIG. 4):

$V_1$: Voltage at which relative light transmittance becomes 10% when voltage was decreased from a bright state.

$V_2$: Voltage at which relative light transmittance becomes 90% when voltage was decreased from a bright state.

$V_3$: Voltage at which relative light transmittance becomes 10% when voltage was increased from a dark state.

$V_4$: Voltage at which relative light transmittance becomes 90% when voltage was increased from a dark state.

Also, driving margin M which is a parameter of the threshold potential and the width of hysteresis were calculated using the voltage $V_2$ to $V_4$ according to the following equation:

$$M = \frac{V_3 - V_2}{V_4 - V_3}$$

When the driving margin M is 2 or more, proper threshold potentials and widths of hysteresis can be obtained and good contrast can be produced at display devices.

Figure 4:
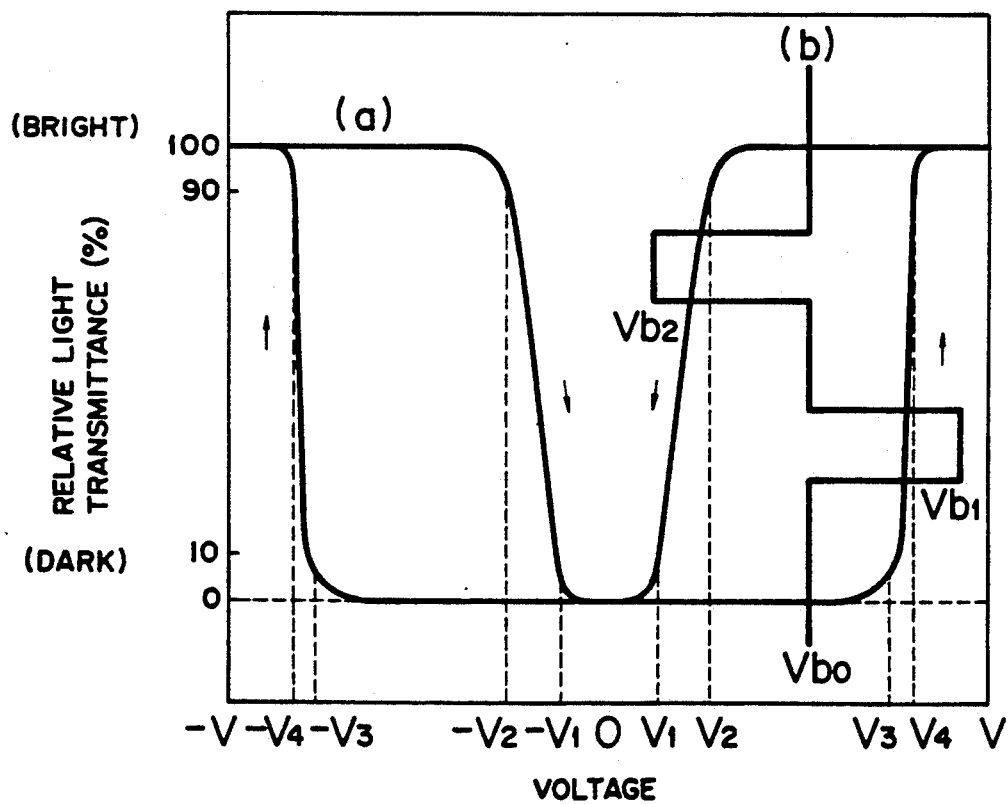
FIG. 4 shows an ideal hysteresis curve of a liquid crystal showing tristable states and having a good memory effect at a dark state.
Figure 5:
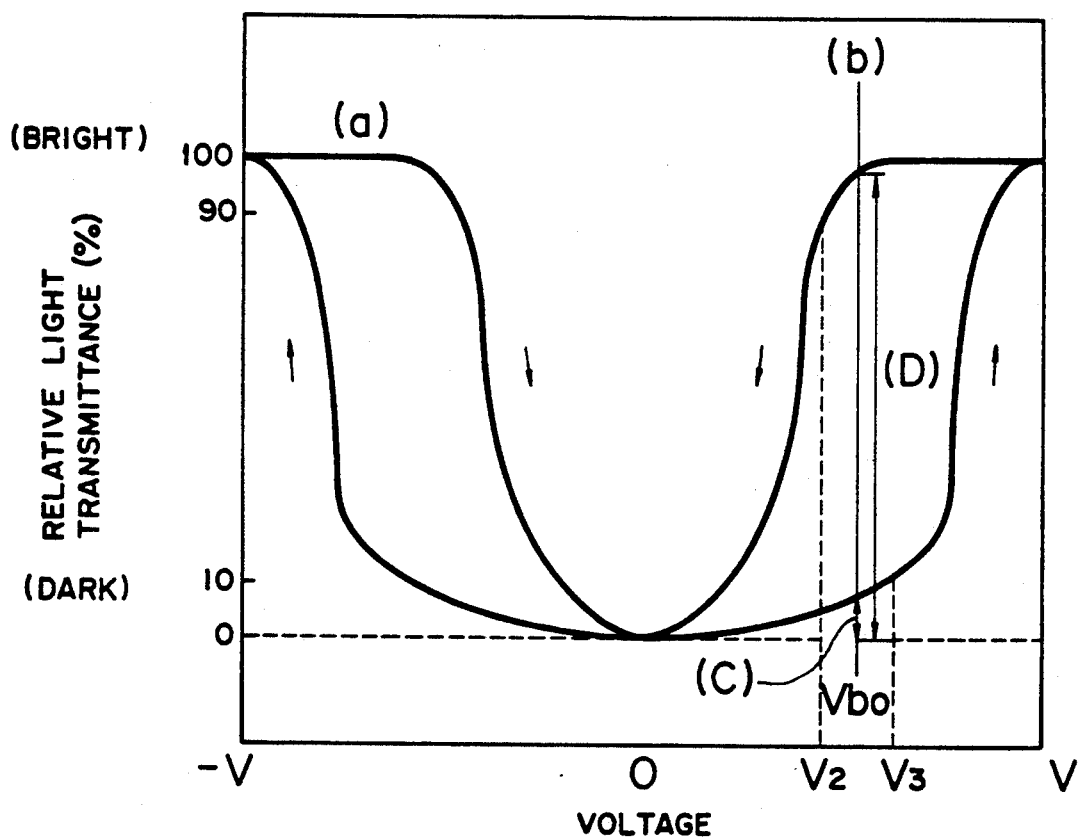
FIG. 5 shows a hysteresis curve for explaining the definition of light leaking ratio as used in the present specification.

Further, in such a hysteresis curve as shown in FIG. 4,

[(C)/(D)]×100 which is the ratio of the relative light transmittance at a dark state (FIG. 5, (C)) to the relative light transmittance at a bright state (FIG. 5, (D)) at a bias voltage $$V_{bo} = [V_2 + V_3] \times \tfrac{1}{2}$$

was calculated as light leaking ratio.

These results are shown in Table 1 wherein T is a measuring temperature, $T_{CA}$ is a temperature at which liquid crystal compounds transit from the $S_A$ or $S^*_c$ phase to the $S^*_{(3)}$ phase.

TABLE 1

| Liquid crystal compound | $V_1$ (v) | $V_2$ (v) | $V_3$ (v) | $V_4$ (v) | M | Light leaking ratio (%) | T-$T_{CA}$ (°C.) |
|---|---|---|---|---|---|---|---|
| Example 1 | 2.5 | 7.9 | 16.3 | 19.2 | 2.9 | 2.3 | −20 |
| Example 2 | 1.0 | 5.8 | 14.6 | 20.4 | 1.5 | 3.2 | −20 |
| Example 3 | 2.0 | 7.1 | 20.4 | 25.8 | 2.4 | 3.2 | −20 |
| Example 4 | 2.4 | 7.5 | 12.5 | 16.3 | 1.3 | 3.1 | −20 |
| Example 5 | 2.5 | 7.5 | 20.0 | 25.0 | 2.5 | 2.3 | −20 |
| Comparative Example | 17.5 | 25.8 | 30.0 | 33.4 | 1.2 | 7.5 | −20 |

As shown in Table 1, the light leaking ratio of the liquid crystal compounds in Examples 1 through 5 are lower than half of the light leaking ratio in Comparative Example, indicating that the liquid crystal compound of the present invention is low and excellent in light leaking ratio.

Also, the liquid crystal compound of the present invention has a lower threshold voltage at $V_3$ and $V_4$ than that in Comparative Example and this fact indicates that the present liquid crystal compound is excellent in driving voltage.

We claim:

1. A liquid crystal compound having an excellent light leaking ratio under tristable states and represented by the following formula:

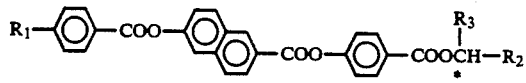

wherein $R_1$ is a $C_6$–$C_{16}$ linear alkyl group or $C_6$–$C_{16}$ linear alkoxy group, $R_2$ is a $C_4$–$C_{12}$ linear alkyl group, $R_3$ is a $C_1$–$C_3$ alkyl group or $C_1$–$C_3$ haloalkyl group, and C having an asterisk indicates an asymmetric carbon atom.

2. The liquid crystal compound according to claim 1 wherein the compound is represented by the following formula:

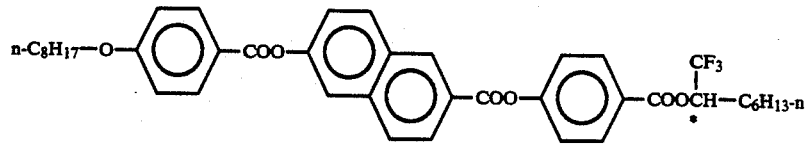

3. The liquid crystal compound according to claim 1 wherein the compound is represented by the following formula:

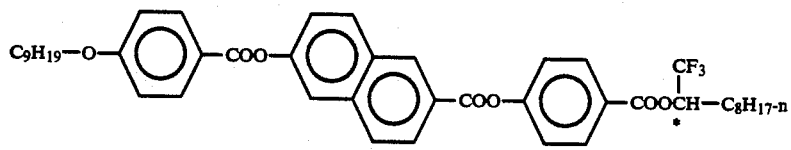

4. The liquid crystal compound according to claim 1 wherein the compound is represented by the following formula:

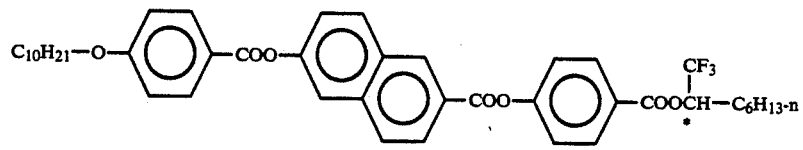

5. The liquid crystal compound according to claim 1 wherein the compound is represented by the following formula:

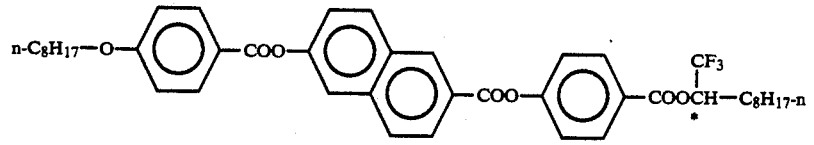

6. The liquid crystal compound according to claim 1 wherein the compound is represented by the following formula:

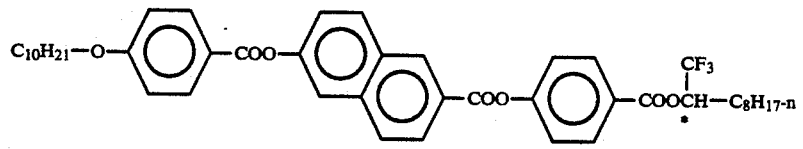

7. A liquid crystal composition comprising at least one compound having an optical activity which is defined in claim 1.

* * * * *